(12) United States Patent
Vicisano et al.

(10) Patent No.: US 7,035,217 B1
(45) Date of Patent: Apr. 25, 2006

(54) ROUTER-ASSISTED MULTICAST CONGESTION CONTROL

(75) Inventors: Lorenzo Vicisano, San Francisco, CA (US); Tony Speakman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 09/693,251

(22) Filed: Oct. 20, 2000

(51) Int. Cl.
  *G01R 31/08* (2006.01)
  *H04L 1/00* (2006.01)

(52) U.S. Cl. .................. 370/236; 370/390; 370/401
(58) Field of Classification Search ............... 370/235, 370/236, 237, 389, 390
  See application file for complete search history.

(56) References Cited

U.S. PATENT DOCUMENTS

| | | | |
|---|---|---|---|
| 5,715,177 A * | 2/1998 | Machida et al. .............. 702/62 |
| 5,793,976 A * | 8/1998 | Chen et al. ................. 709/224 |
| 6,031,818 A * | 2/2000 | Lo et al. ..................... 370/216 |
| 6,091,725 A | 7/2000 | Cheriton et al. | |
| 6,188,674 B1 * | 2/2001 | Chen et al. ................. 370/252 |
| 6,298,061 B1 | 10/2001 | Chin et al. | |
| 6,304,546 B1 | 10/2001 | Natarajan et al. | |
| 6,356,629 B1 | 3/2002 | Fourie et al. | |
| 6,400,686 B1 | 6/2002 | Ghanwani et al. | |
| 6,430,155 B1 | 8/2002 | Davie et al. | |
| 6,434,624 B1 | 8/2002 | Gai et al. | |
| 6,483,850 B1 | 11/2002 | Chui et al. | |
| 6,501,763 B1 * | 12/2002 | Bhagavath et al. ......... 370/432 |
| 6,512,769 B1 | 1/2003 | Chui et al. | |
| 6,515,967 B1 | 2/2003 | Wei et al. | |
| 6,661,778 B1 * | 12/2003 | Trofin et al. ................. 370/252 |
| 6,693,907 B1 * | 2/2004 | Wesley et al. .............. 370/390 |

OTHER PUBLICATIONS

Tanenbaum, Andrew, Computer Networks, Third Edition (1996) pp. 374-395.
Speakman, Tony, "PGM Reliable Transport Protocol Specification," Internet Draft (Apr. 2000).

* cited by examiner

*Primary Examiner*—Brian Nguyen
(74) *Attorney, Agent, or Firm*—Cesari and McKenna, LLP

(57) ABSTRACT

The invention provides a convenient and expandable method for transmitting one or more loss rate statistics determined in a distributed manner from a multicast distribution tree to a source computer. First, the loss rate statistics are collected in a distributed manner from target receiver stations, and from routers in the multicast distribution tree. Second, there is a distributed calculation of statistics on loss rate by routers in the multicast distribution tree. Third, there is transportation of the loss rate statistics back to the source computer in reverse along the multicast distribution tree. For example, congestion information is collected by routers, and the congestion information is sent upstream to the multicast source station in fields of NAK messages. A router may receive a NAK packet in transit from an intended destination station to a source station, the NAK packet indicating loss of a data packet. The router writes a loss rate statistic determined by the router into a "loss rate field" of a message to be sent upstream along the reverse of the distribution tree. The router determines the loss rate statistic to be written into the loss rate field of the message, in response to: analyzing the loss rate statistics on each of its links; the loss rate reported by the incoming NAK packet; and, the elapsed time from the time stamp showing when the various loss rate statistics were determined.

69 Claims, 7 Drawing Sheets

ROUTER-ASSISTED MULTICAST CONGESTION CONTROL

FIELD OF THE INVENTION

This invention relates to multicast transfer of packets over a computer network, and more particularly to control of congestion in intermediate links of the computer network during multicast transfer.

BACKGROUND OF THE INVENTION

Modern computer networks often have many routers interconnected, and the routers route multicast packets from at least one source station to multiple destination stations. Additionally, the routers route ordinary data traffic in the computer network, and may route many different multicast sessions, each session originating from a different source station. Links of the network between routers may become congested from the traffic load which they are required to carry. When a link becomes congested, the packets may be discarded by a router, that is, the router may simply drop the packet rather than transmit it.

Congestion of a link is often caused by a transmitting queue in a transmitting router which sends packets to the link becoming full, so that there is no place in the transmitting queue to store the next packet to be transmitted. So, the next packet is simply discarded by the router rather than being transmitted.

Alternatively, a link may be congested because a receiving router has its receiving buffers filled, and that router is unable to store the packet as it arrives at the receiving router. The incoming packet is then simply discarded rather than being "received" by the receiving router.

It is desirable, when data files are transported over a computer network, to have all of the packets arrive at the destination station. Likewise, in a multicast session, after a destination station joins the multicast group, it is desirable that the destination station receive all subsequently transmitted multicast data packets.

Various multicast protocols use different methods to deal with loss of multicast packets. It is standard engineering practice for the multicast packets to carry a sequence number, and so a destination station can monitor the sequence numbers of the packets which it receives, and if any sequence number is missing, learn that the corresponding packet is missing. For example, some multicast protocols, such as PGM (full name, Pragmatic General Multicast) described in an Internet Draft which is posted on the Internet Engineering Task Force (IETF) website at www.ietf.org, use negative acknowledgement (NAK) messages transmitted by destination stations which do not receive a multicast packet. The NAK message requests re-transmission of the lost packet. For example, the source station receives a NAK message and then re-transmits the missing packet. Alternatively, designated repair stations receive the NAK message and re-transmit the missing packet.

In PGM an important mechanism reduces the number of NAK messages by, for example, having a router forward a NAK message requesting a particular missing packet only once, rather than forwarding each NAK message transmitted by each destination station for which the packet is lost, etc. The re-transmitted packet will also, ordinarily, pass through the congested link, thereby making a further contribution to congestion on that link.

In more detail, some multicast protocols, such as the PGM protocol, have routers eliminate NAK packets. A router remembers which sequence number of multicast group data packets it has recently requested, and in the event that a later NAK packet requests the same sequence number, the router does not transmit a duplicate NAK packet. By eliminating NAK packets, the routers guard against a problem known as "NAK implosion", where a NAK packet from every destination station is transmitted to the source station. In the event that there are hundreds, or for example millions, of destination stations for the multicast group and a key link becomes congested, then perhaps millions of destination stations will be missing a packet with a particular sequence number. Each destination station missing the multicast group data packet transmits a NAK packet, and so millions of NAK packets may be transmitted by the destination stations. The source station would be overwhelmed by a million NAK packets requesting re-transmission of the same multicast group data packet. By eliminating the NAK packets, the routers avoid NAK implosion at the source station. The PGM specification describes elimination of NAK packets by the routers.

It is also standard engineering practice to have the source station reduce its transmission rate in response to receiving NAK packets. For example, both a leaky bucket algorithm and a token bucket algorithm are discussed in detail by Andrew Tanenbaum in his book *Computer Networks, Third Edition*, published by Prentice Hall, Copyright date 1996, all disclosures of which are incorporated herein by reference, especially at pages 374–395. A source end station may increase its transmission rate to a maximum transmission in the absence of receiving NAK packets, and then reduce its transmission in response to receiving the NAK packets through implementation of an algorithm such as the leaky bucket or token bucket algorithms. Again, in the absence of receiving NAK packets, the source end station increases its transmission rate until it again receives NAK packets. Using feedback from the intended destination end stations the source end stations raise and lower their transmission rate, in response to network conditions detected by the destination end stations. Further, in the PGM specification, a source station of a multicast session reduces its transmission rate in response to receiving NAK messages.

A disadvantage of relying on NAK messages to eliminate congestion is that if a packet is lost at an intermediate link delivering multicast packets to many destination stations, then each destination station will transmit a NAK message. These NAK messages consume a lot of network bandwidth, even though the number of upstream messages is reduced by selective forwarding, as is done in the PGM protocol. Further, in the event that the NAK messages are diverted to "repair stations", the source station may not learn that it should reduce its transmission rate. Further, simply responding to NAK messages is a relatively crude way for the source station to learn that congestion is occurring in the network.

A further method presently used to avoid congestion by multicasting source end stations is the Resource reSerVation Protocol, the RSVP protocol. The RSVP protocol is described by Tanenbaum in his book *Computer Networks, Third Edition* at pages 393–395. In the RSVP protocol, source end stations reserve bandwidth through a multicast distribution tree which incorporates all members of the receiving group for the multicast session. A disadvantage of the RSVP protocol is that reservation of bandwidth through a multicast distribution tree requires heavy expenditure of resources for overhead, and a reservation of bandwidth method does not respond adequately to dynamic changes in conditions on the computer network.

There is needed a flexible method of congestion control for computer networks, especially a method which can handle multicast flows from a source end station to multiple destination stations, and can also respond dynamically to changes in the computer network.

SUMMARY OF THE INVENTION

The invention provides a convenient and expandable method for transmitting one or more loss rate statistics determined in a distributed manner from a multicast distribution tree to a source computer of the multicast distribution. First, the loss rate statistics are collected in a distributed manner from target receiver stations, and from routers in the multicast distribution tree. Second, there is a distributed calculation of loss rate statistics rate by routers in the multicast distribution tree. Third, there is transportation of the loss rate statistics back to the source computer in reverse along the multicast distribution tree. The source computer is then informed of loss rate statistics from all parts of the multicast distribution tree, including any bottleneck links in the multicast distribution tree.

For example, congestion information is collected by routers, and the congestion information is sent upstream to the multicast source station in fields of NAK messages, or in the fields of loss report messages. A multicast flow is ordinarily established from a source station through a multicast distribution tree of routers to a group of destination stations. The NAK message is often a unicast message transmitted by a destination station to the source station, and which follows a route "up the distribution tree" of multicast distribution. Alternatively, a NAK message may be transmitted as a multicast message. A router may receive a NAK packet in transit from an intended destination station to a source station, the NAK packet indicating loss of a data packet. The router writes a loss rate determined by the router into a "loss rate field" of a message to be sent upstream along the reverse of the distribution tree, for example another NAK packet, or for example, a loss report message. The router determines the loss rate to be written into the loss rate field of the NAK packet, etc., in response to: analyzing the loss rate on each of its links; the loss rate reported by the incoming NAK packet; and, the elapsed time from the time stamp showing when the various loss rates were determined. For example, the router writes the largest of these loss rates into the loss rate field of the loss report message, or upstream NAK packet, etc. Alternatively, the router may write a new loss rate based on the various factors into the loss rate field of the loss report message. The router then transmits the loss report message as a unicast message up the multicast distribution tree to the next higher router. Alternatively, the router may use multicast, etc., to transmit the loss report message upstream to the next higher router in the multicast distribution tree. The source station receives the loss report message after it has passed through all of the routers used by the multicast flow to reach the particular destination station. Thus, the loss rate carried in the loss rate field of the loss report message packet as it is received by the source station may give the largest loss rate determined by any of these routers, or may give another representative loss rate. Further, at higher levels of the multicast distribution tree, the loss rates are consolidated from those reported by routers on different branches and lower in the multicast distribution tree. The source station responds to the value carried in the loss rate field of the loss report message to control its transmission rate. Accordingly, the source station responds to the loss rate at the bottleneck link on the distribution tree from the source station to all of the destination stations.

BRIEF DESCRIPTION OF THE DRAWINGS

Turning now to the drawings in which like parts are referred to by like reference numbers in the several views.

DETAILED DESCRIPTION OF AN ILLUSTRATIVE EMBODIMENT

The invention provides a convenient and expandable method for transmitting one or more loss rate statistics determined in a distributed manner from a multicast distribution tree to a source computer of the multicast distribution. First, the loss rate statistics are collected in a distributed manner from target receiver stations, and from routers in the multicast distribution tree. Second, there is a distributed calculation of loss rate statistics rate by routers in the multicast distribution tree. Third, there is transportation of the loss rate statistics back to the source computer in reverse along the multicast distribution tree. The source computer is then informed of loss rate statistics from all parts of the multicast distribution tree, including any bottleneck links in the multicast distribution tree.

First Exemplary Embodiment

Figure 1:
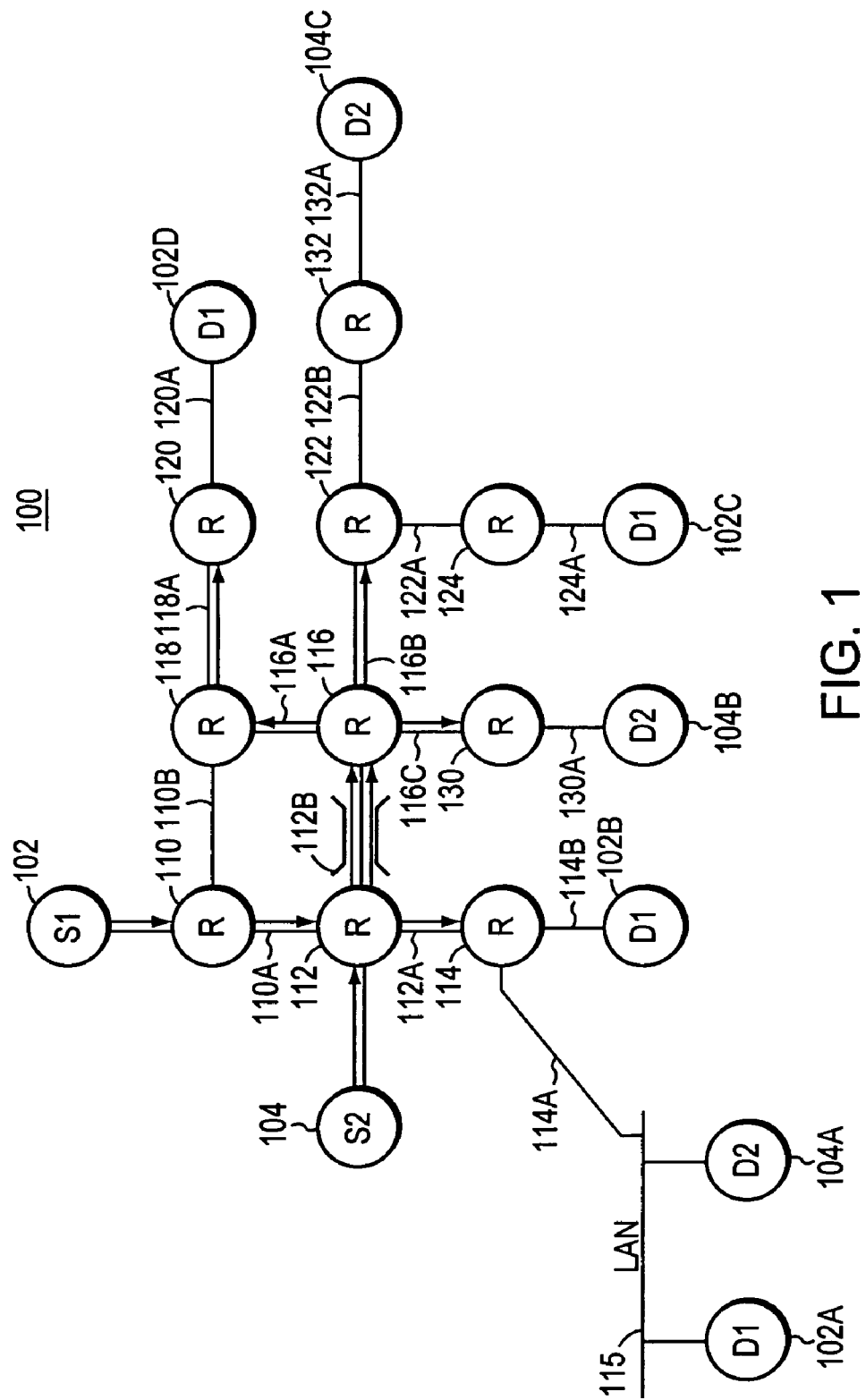
FIG. 1 is a block diagram of a representative computer network.

Turning now to FIG. 1, computer network 100 is shown. For the purpose of this discussion, source stations are indicated by "S", routers are indicated by "R", and destination stations are indicated by "D". Destination stations may also become source stations, etc., and for the purpose of this discussion only, the stations have the indicated roles.

Source station 102 and source station 104 both are transmitting data packets onto computer network 100. For the purpose of this discussion, both source station 102 and source station 104 are sources of multicast group data packets.

Source station 102 transmits multicast group packets to the group of stations comprising destination stations marked as group "D1", for example destination stations 102A, 102B, 102C, 102D, etc. These packets are referred to as group D1 multicast group data packets.

Further, source station 104 transmits multicast group packets to the group of stations comprising destination stations marked as group "D2", for example destination stations 104A, 104B, 104C, 104D, etc. These packets are referred to as group D2 multicast group data packets.

In tracing the multicast data packets D1 transmitted by source station 102 to destination stations D1 along the route of the multicast distribution tree, the packets first go to router 110. Router 110 routes the D1 packets along link 110A to router 112, but router 110 does not route the D1 packets along link 10B. The multicast distribution tree, when it was first set up, uses link 10A but does not use link 10B. Router 112 routes the multicast group D1 packets along link 112A to router 114, and along link 112B to router 116.

Router 114 routes the D1 packets along link 114A to local area network (LAN) 115. Destination group D1 station 102A receives the multicast group D1 packets from LAN 115. Also, router 114 routes the D1 packets along link 114B to destination group D1 station 102B.

Returning to router 112, router 112 routes the multicast group D1 packets long link 112B to router 116. Router 116, in turn, routes the D1 packets along link 116A to router 118. Router 118 routes the D1 packets along link 118A to router 120. Router 120 routes the multicast group D1 packets along link 120A to destination group D1 station 102D.

Returning to router 116, router 116 also routes the multicast group D1 packets along link 116B to router 122. Router 122 routes the D1 packets along link 122A to router 124, but does not route the packets along link 112B as there are no group "D1" destination stations downstream along link 122B. Router 124 routes the multicast group D1 packets along link 124A to destination group D1 station 102C.

Again returning to router 116, router 116 does not route the multicast group D1 packets along link 116C because there are no D1 group destination stations downstream along link 116C.

Next we trace the multicast group D2 packets transmitted by source station 104. The packets go first to router 112. Router 112 routes the packets along link 112A to router 114, and also routes the packets along link 112B to router 116. Router 114 routes the packets along link 114A to LAN 115 where group D2 station 104A receives the multicast group D2 packets. Router 114 does not route the D2 packets along link 114B because there are no D2 destination stations downstream along link 114B.

Returning to router 116, router 116 routes the D2 packets along link 116B to router 122, and along link 116C to router 130. Router 122 routes the D2 packets along link 122B to router 132, where router 132 routes the packets along link 132A to destination group D2 station 104C. Router 122 does not route the D2 packets along link 122A because there are no D2 destination stations downstream along link 122A.

Again returning to router 116, router 116 routes the D2 packets along link 116C to router 130. Router 130 routes the D2 packets along link 130A to destination group D2 station 104B.

Link 112B carries both the multicast group D1 packets transmitted by source station 102, and carries the multicast group D2 packets transmitted by station 104. Further, link 112B may carry other traffic, for example unicast traffic, transmitted by various stations of computer network 100. Link 112B may become congested as a result of the heavy load of traffic which it carries. In the example of the two multicast groups, the transmit queue at link 112B could become filled because the link 112B does not have enough capacity to accept all incoming packets, so that the next packets which arrive at router 112 have no queues to hold them. In the case that there are no transmit queues available, the incoming packet is discarded.

In the event that a multicast group data packet such as, for example group D1 packet or group D2 packet, is discarded, then the downstream destination stations will not receive the discarded packet. The destination stations keep track of the sequence number in the multicast group packets which they receive. The destination stations will notice that a particular sequence number, or series of sequence numbers, is missing. The destination stations will then transmit a NAK message to request that the sending station re-transmit the missing packet.

The NAK message is a unicast packet of specified protocol. The NAK message is described with reference to FIG. 2. The NAK message is transmitted, first by the destination station which is missing a multicast group data packet, and then by the routers upstream along the multicast group distribution tree. Accordingly, a NAK message travelling up the multicast distribution tree is a unicast packet transmitted by a router to its upstream router for the multicast group distribution tree. Each router along the multicast group distribution tree then repeats the NAK message as a unicast message to its up stream router, until finally the NAK message reaches the source station for the multicast group.

Figure 2:
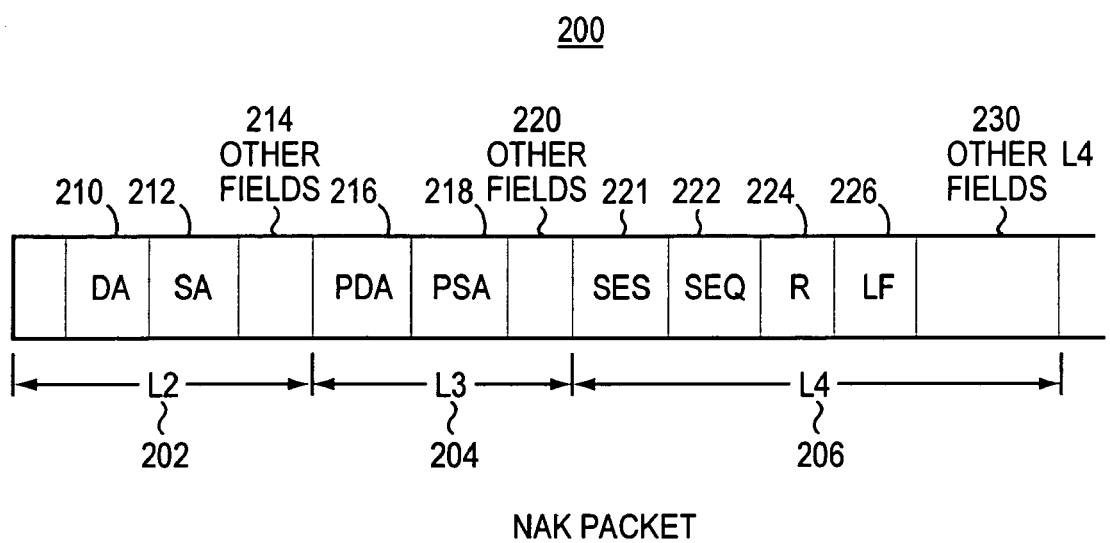
FIG. 2 is a field diagram of a NAK message, in accordance with the invention.

Turning now to FIG. 2, a field diagram of a NAK packet 200 in accordance with the invention is shown. NAK packet 200 has a layer 2 header 202, a layer 3 header 204, and layer 4 header 206.

Layer 2 header 202 contains destination address DA in field 210, and source address SA in field 212. Other layer 2 fields are included in fields 214. The layer 2 fields are written by a source station to send the NAK packet as a unicast message to the first upstream router. A router receiving the NAK packet then transmits the NAK packet as a unicast message to the router from which it receives the multicast group data packets. In this way the NAK packet is sent hop-by-hop up the multicast distribution tree as a sequence of unicast messages.

The layer 3 header 204 has the protocol destination address in PDA field 216, and the protocol source address in field PSA field 218. Other layer 3 fields are represented by field 220. The protocol address are typically the Internet Protocol address fields, IP fields. The IP fields are written by the transmitting destination station or by an intermediate router, so that the unicast NAK message travels upstream along the next hop to the next router upstream from the transmitting entity. This choice of address insures that the unicast NAK message travels upstream along the multicast distribution tree.

An exception to the hop-by-hop travel of a NAK packet upstream along the multicast group distribution tree must be described. A network, particularly a large network such as the worldwide Internet, may have routers in which the present invention has not been implemented. These routers which do not have the present invention implemented are referred to as "legacy routers". The multicast distribution tree may be established to include some legacy routers. A router implementing the invention knows which upstream routers implement the present invention and which are legacy routers. Also a router implementing the present invention knows the address of the next upstream router which does implement the present invention. In an exemplary embodiment of the invention, the router then simply transmits the NAK message as a unicast message to the next upstream router implementing the present invention. However, any congestion occurring in a legacy router will not be reported to the source station.

Layer 4 header 206 contains fields used for controlling congestion in computer network 100.

Field 221, the SES field, contains the transport session identifier. This is the layer 4 session identifier.

Field SEQ 222 contains a sequence number. The sequence number in field SEQ 222 gives the number of the packet which needs to be re-transmitted. This is the sequence number of the packet which is missing at the destination station which initiated NAK message 200. The replacement multicast group packet is transmitted as a multicast group packet, and so the station address of the initiating destination station is not carried by the NAK packet.

Field R 224 gives the loss rate computed by the last router, the router which forwarded NAK message 200.

Field LF 226 gives a lifetime for aging out the recent loss rate R carried in field 224.

Fields 230 contain other layer 4 fields used by the NAK message.

Figure 3:
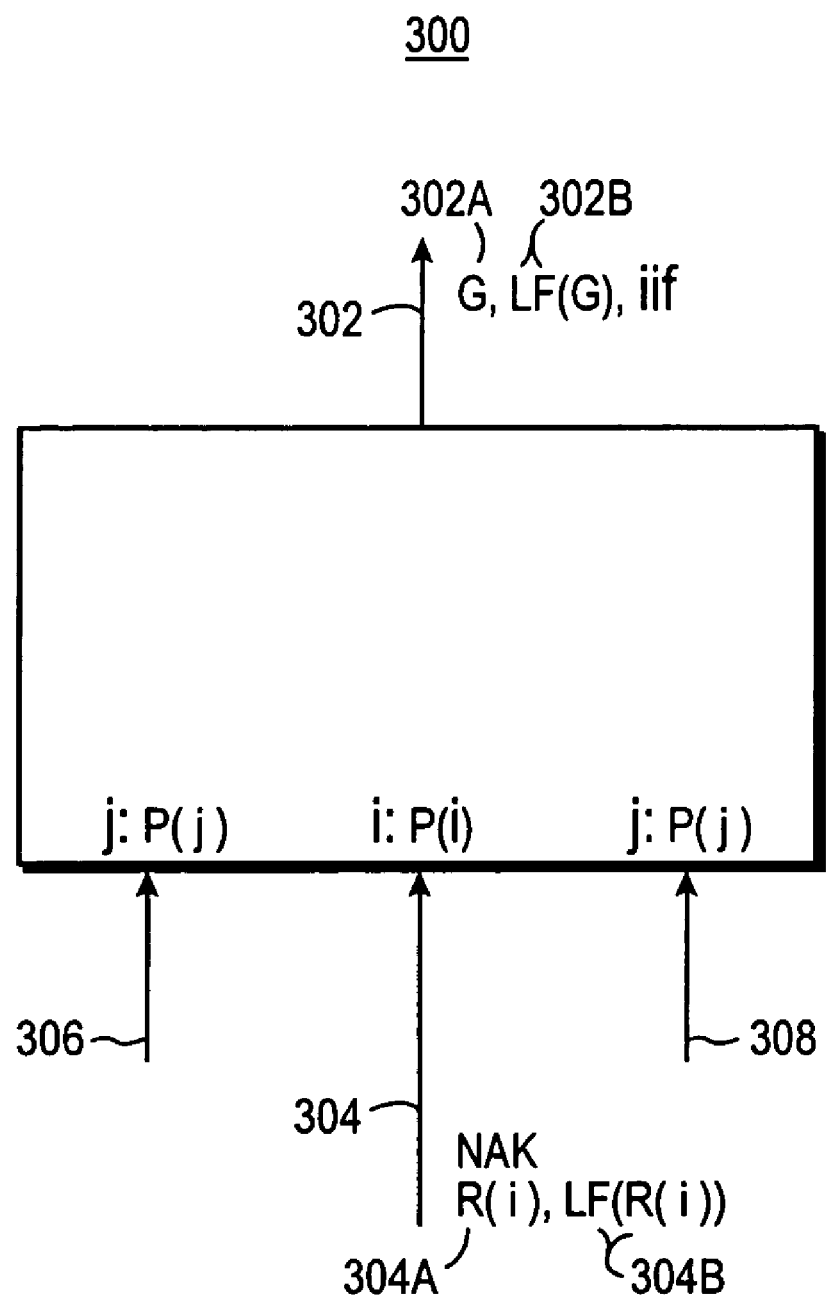
FIG. 3 is a block diagram of a router showing variables used in calculation of a loss rate reported by the router, in accordance with the invention.

Turning now to FIG. 3, a calculation of both: the loss rate to write into field R 224; and, the lifetime for aging out the loss rate to write into field LF 226, of an outgoing NAK packet is illustrated.

Interface 302 is the upstream interface in the multicast group distribution tree, where the group is identified as the multicast group for which the currently received NAK message belongs.

G 302A is the value of loss rate to be written into field 224 R of the NAK message to be transmitted through upstream interface 302 as a unicast message to the next upstream router implementing the invention.

LF (G) 302B is the lifetime of loss rate G to be written into field LF 226 of the NAK message to be transmitted through upstream interface 302 as a unicast message to the next upstream router implementing the invention.

Interface 304 is the downstream interface "i" at which the currently received NAK message was received.

R(i) 304A is the value of loss rate read from field R 224 by router 300 from the currently received NAK message.

LF(R(i)) 304B is the lifetime of R 304A read from field LF 226 of the currently received NAK message.

Interface 306 is another interface of router 300 used to transmit packets of the multicast group, is addressed as interface "j" as j loops through interface numbers, and has a measured loss rate of value P(j) as determined by router 300.

Interface 308 represents another interface 300 used to transmit packets of the multicast group of router 300. Interface 308 is also addressed as "j" as j loops through interface numbers, and has a measured loss rate of value P(j) as determined by router 300.

The quantities of loss rate, P, S, G, R, etc. may conveniently be expressed as dimensionless, that is as percentages or fractions of packets dropped.

The units of time variables, LF_MAX, LF(R), LF(G) are typically seconds. Representative values for LF_MAX(R) are typically in the range from tenths of seconds to a few seconds. Values for the other time variables range from zero to LF_MAX.

The calculation is further illustrated by the following pseudo code.

G: Loss rate value to write in the outgoing NAK, in field R 224.

LF(G): Lifetime of G, to write in the outgoing NAK, in field LF 226.

R: Loss rate value read from incoming NAK, read from field R 224.

LF(R): Lifetime of R read from incoming NAK, read from field LF 226.

i: Interface on which the current NAK is received.

P[j]: Loss rate measured by the router on interface "j". This is the background loss rate measured by the router, and due to cumulative traffic through the interface "j". The values of P[j] are measured by the router in response to the number of packets which the router drops as it transmits general traffic onto links used by the multicast distribution tree. The value of P[j] includes dropping of packets of both the present multicast distribution tree, and all other traffic transmitted through the port "j".

S[i]: Loss rate recorded on interface "i" for the multicast session to which the currently received NAK belongs. S[i] is the most recently reported loss rate received on an interface "i" in a NAK belonging to the multicast group session to which the currently received NAK message belongs.

EXP(S[i]): Expiration time of S[i]

NOW: Current time

LF_MAX: a constant representing a maximum lifetime attributed to a current measured loss rate.

Note: The P[j] are measured by the router, and are for a specific interface "j" for all traffic. The values are global for the router interface "j", and not one each for each multicast group session at the interface, that is there is one value for each interface "j".

Note, in contrast: The S[i] and LF(S[i]) are different values for each multicast session, that is they are both per-session values, and per interface "i" values.

Note, the quantities "i" and "j" are indexes to interfaces, with "i" indicating the interface on which the most recently received NAK was received, and "j" being a variable index which is incremented during the calculation to address each interface in succession.

BEGIN

When a NAK belonging to a given multicast group session is received on interface "i":

First update S[i] and EXP(S[i]):
1: S[i] <— R
2: EXP(S[i]) <— (NOW+LF(R))
Then compute G and LF(G) for the outgoing NAK
Start by initializing G and LF(G) with a "neutral" value of "0".
3: G <— 0
4: LF(G) <— 0
Assign to G the maximum value among all the P[j] and S[j]
and update LF(G) accordingly
5: for each "j"<belonging to the outgoing interface list of the multicast session>
6: do
7: if(G<P[j]) then
8: G <— P[j]
9: LF(G) <— LF_MAX
10: endif
Consider S[j] only if its lifetime is not expired
11: if(G<S[j] and (NOW<EXP(S[j])) then
12: G <— S[j]
13: LF(G) <— (EXP(S[j]) − NOW)
14: endif
15: done
16: END_BEGIN Accordingly, the router transmits the largest value of loss rate which it "knows about" to the upstream link of the multicast spanning tree.

Turning now to FIG. 4, a flow chart for process 400 is shown. Process 400 is an exemplary process initiated upon receipt of a NAK message from a port of the router, and is substantially the process of the above pseudo code. Decision block 402 executes a loop, or otherwise waits for an interrupt upon receipt of the NAK message, by idling through idle loop 404 waiting for receipt of a NAK message. In the event that a NAK packet is received by the router at a port, decision block 402 answers "yes" and the process goes to block 406. Alternatively, receipt of a NAK message could simply launch process 400.

At block 406 the value of drop rate R carried by the NAK packet is read, along with the value of the lifetime for that drop rate LF. That is R from the NAK packet at field R 224 is read, and LF(R) from field 226 is read. From block 406 the process 400 goes to block 407.

At block 407 the process 400 computes the value of loss rate P[j] for each port j. The P[j] are measured by the router, and are for a specific interface "j" for all traffic. The values are global for the router interface "j", and not one each for each multicast group session at the interface, that is there is one value for each interface "j". The values P[j] are background loss rate measured by the router, and due to cumulative traffic through the interface "j". The values of P[j] are measured by the router in response to the number of packets which the router drops as it transmits general traffic onto links used by the multicast distribution tree. The value of P[j] includes dropping of packets of both the present multicast distribution tree, and all other traffic transmitted through the port "j". After completing block 407, process 400 goes to block 408.

At block 408 process 400 computes the values of loss rate G and lifetime for G, that is LF(G), to write into a NAK packet to be transmitted by the router. Process 400, as shown in the pseudo code, finds the largest value of the loss rate which has not expired, and which is known to the router, including those values measured or calculated by the router, and the value brought by the received NAK, as read at block 406. The outgoing loss rate G is then set equal to this largest value. Upon completion of block 408, process 400 goes to decision block 409. The value of LF(G) is computed in accordance with the calculation described in the pseudo code.

At block 409 the value of G computed at block 408 is tested against a limit value. The test is performed, for example, by testing the absolute value of the fractional change in G against an epsilon value. In the event that the fractional change in G is large enough, then the process 400 goes to block 410 where the new value of G is placed in the outgoing NAK message. In the event that the fractional change is not greater than the epsilon value, the process goes along path 420 to block 402 where it again waits for a NAK to be received.

At block 410 the value of G and LF(G) determined at block 408 are written into the fields of the outgoing NAK message. Upon completion of block 410, process 400 goes to block 412.

At block 412 process 400 transmits the NAK message through the proper interface. The proper interface is the interface from which the router receives multicast group data packets, so that the NAK message traverses, in reverse order, the links of the multicast group distribution tree. Upon completion of block 412, process 400 returns along path 422 to block 402 where it waits for receipt of the next NAK packet from a destination station, or intermediate router, of the multicast group distribution tree.

Figure 4A:
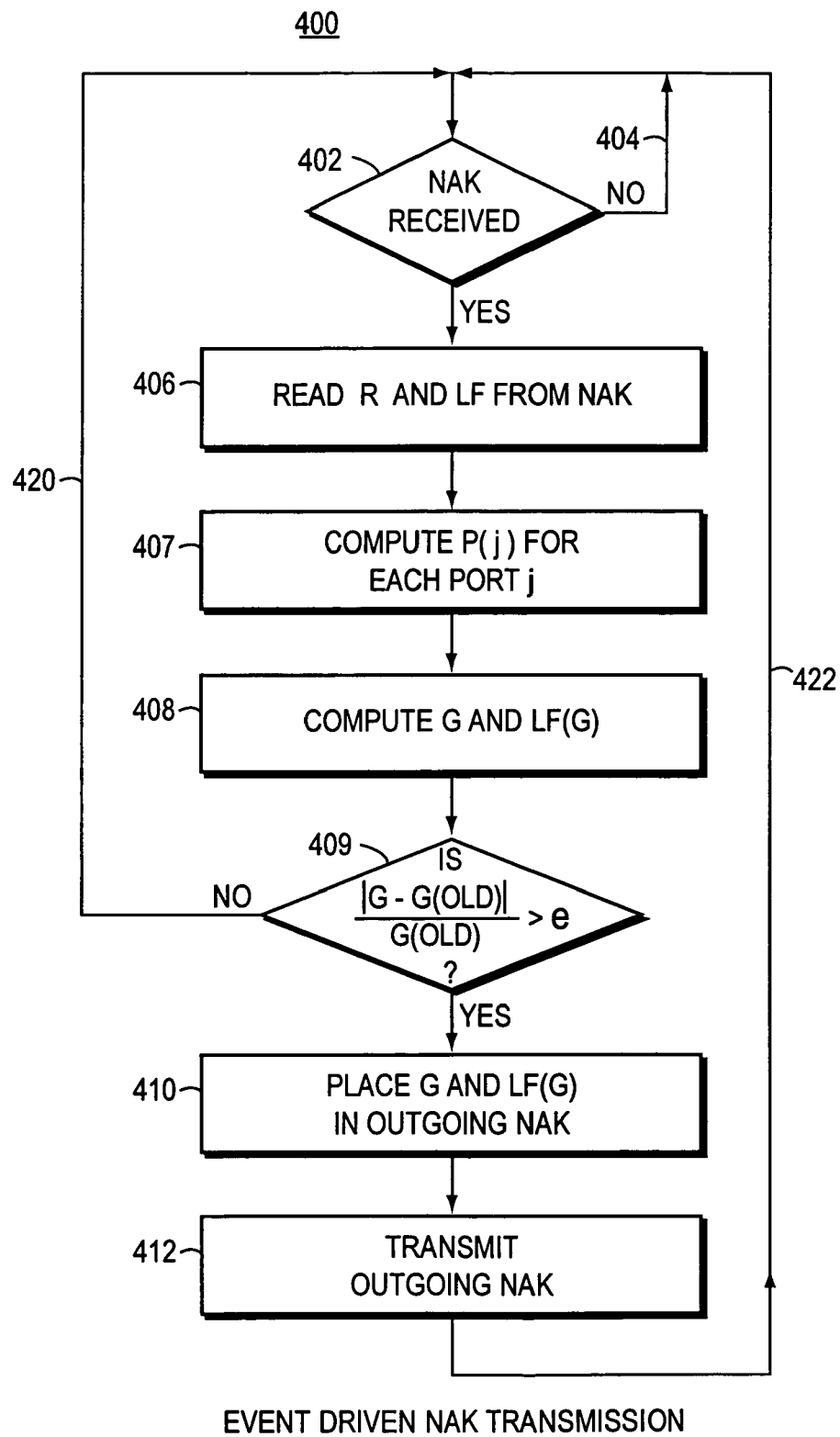
FIG. 4A is a block diagram of a flow chart of a process in accordance with the invention.
Figure 4B:
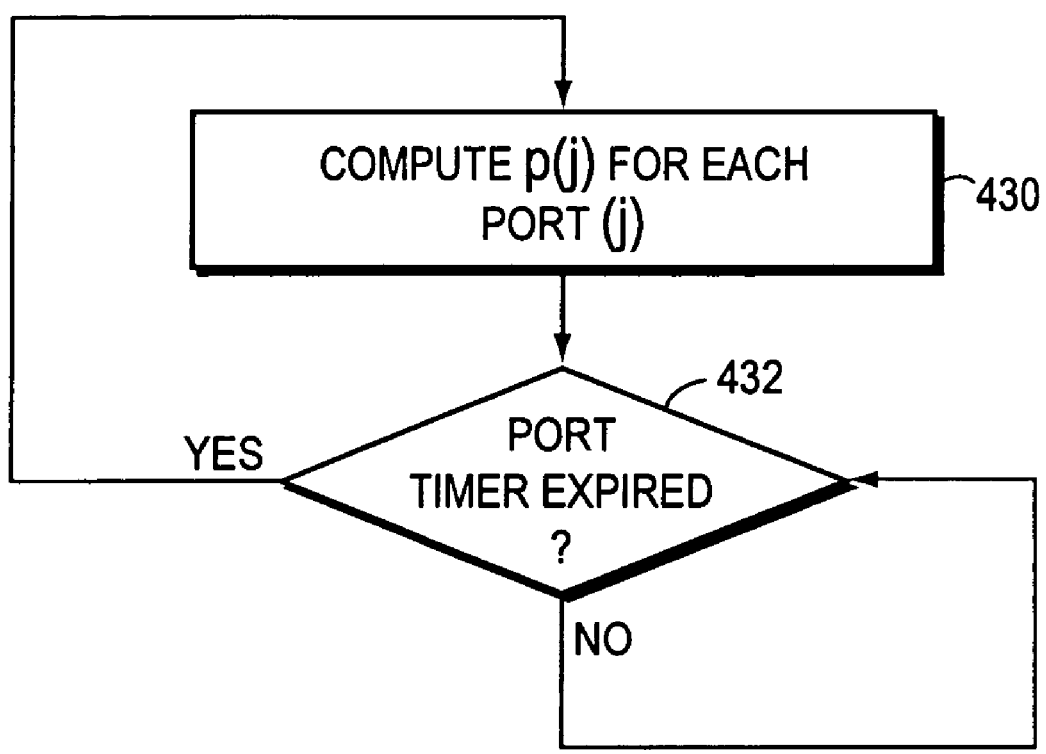
FIG. 4B is an alternate block diagram for the calculation shown in FIG. 4A.

Turning now to FIG. 4B, an alternate form of the calculation at block 407 is shown. In FIG. 4A, the values of P(j) are calculated upon the event that a NAK is received by the router. In the alternative calculation of block 407 shown in FIG. 4B, the values of P[j] for each port [j] are computed periodically at block 430, as controlled by the port timer as shown in block 432. When a NAK is received, the values of P[j] for each port as calculated by block 430 at the last periodic calculation are used by the router at block 407, as it executes process 400.

Figure 4C:
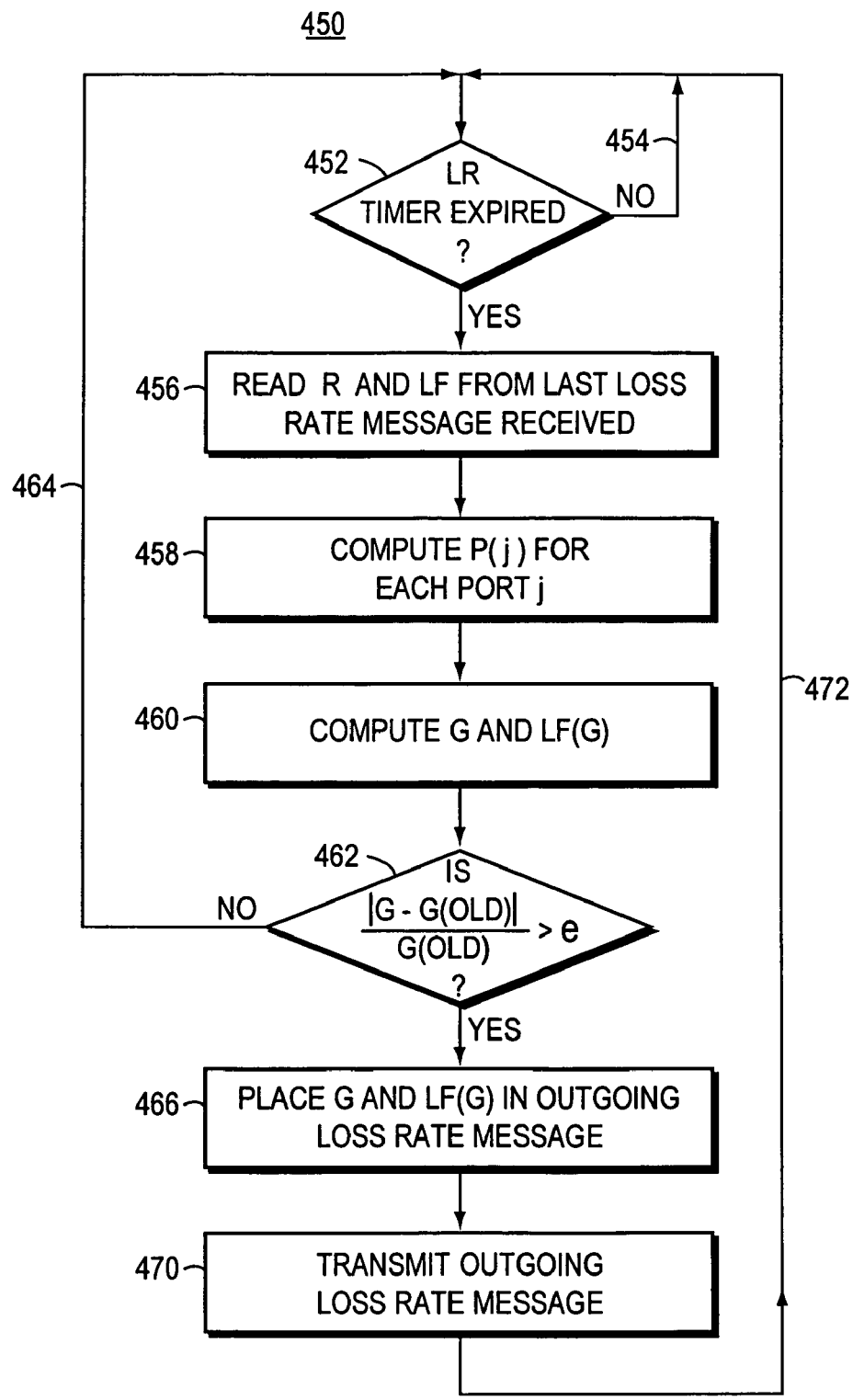
FIG. 4C is a block diagram of a flow chart of a process in accordance with the invention.

Turning now to FIG. 4C, a flow chart of an alternative process 450 for the present invention is shown. A router using process 450 periodically transmits a loss rate message. At block 452 a "loss rate timer" (LR timer) controls further computation. In the event that the LR timer has not expired, the process returns along path 454 to block 452. In the event that the LR timer has expired, the process goes to block 456.

At block 456 the process reads the loss rate "R" received in the last loss rate message, and the lifetime "LF" of the loss rate received from ports since transmission of the last loss rate message upstream, as transmitted at block 470. The loss rate messages are received from a target receiver station in the event that the router is at the edge of the multicast distribution tree, or the loss rate message is received from a downstream router in the event that the router being discussed is an intermediate router. The process then goes to block 458.

At block 458 the loss rate values of P[j] for each port "j" are computed. The process then goes to block 460.

At block 460 the values of G and the lifetime LF[G] are computed. The values are computed in response to the values of R and LF read in block 456, and in response to the values of P[j] computed for each port "j" at block 458. The process then goes to block 462.

At block 462 the change in G from the last value G(old) to the present value is computed. The "change" is computed as the absolute value of the fractional change. In the event that the change is less than the threshold value epsilon (e), then the process returns along path 464 to block 452.

The test of block 462 is used to avoid transmitting a new loss rate message in the event that the new computed value of G is not significantly different from the last computed value of loss rate, G(old). In the event that the fractional change in G is larger than the threshold change value "e", the process goes to block 466.

At block 466 the process 450 places the new values of G and lifetime LF[G] in the fields on an outgoing loss rate message. The process 450 then goes to block 470.

At block 470 the router then transmits the outgoing loss rate message through its upstream port of the multicast distribution tree. After transmitting the loss rate message, the process 450 returns along path 472 to block 452.

The loss rate message of process 450 may be a NAK format message, or may be any convenient message format to transmits loss rate up the multicast distribution tree from a receiver target computer to a source computer.

Figure 5:
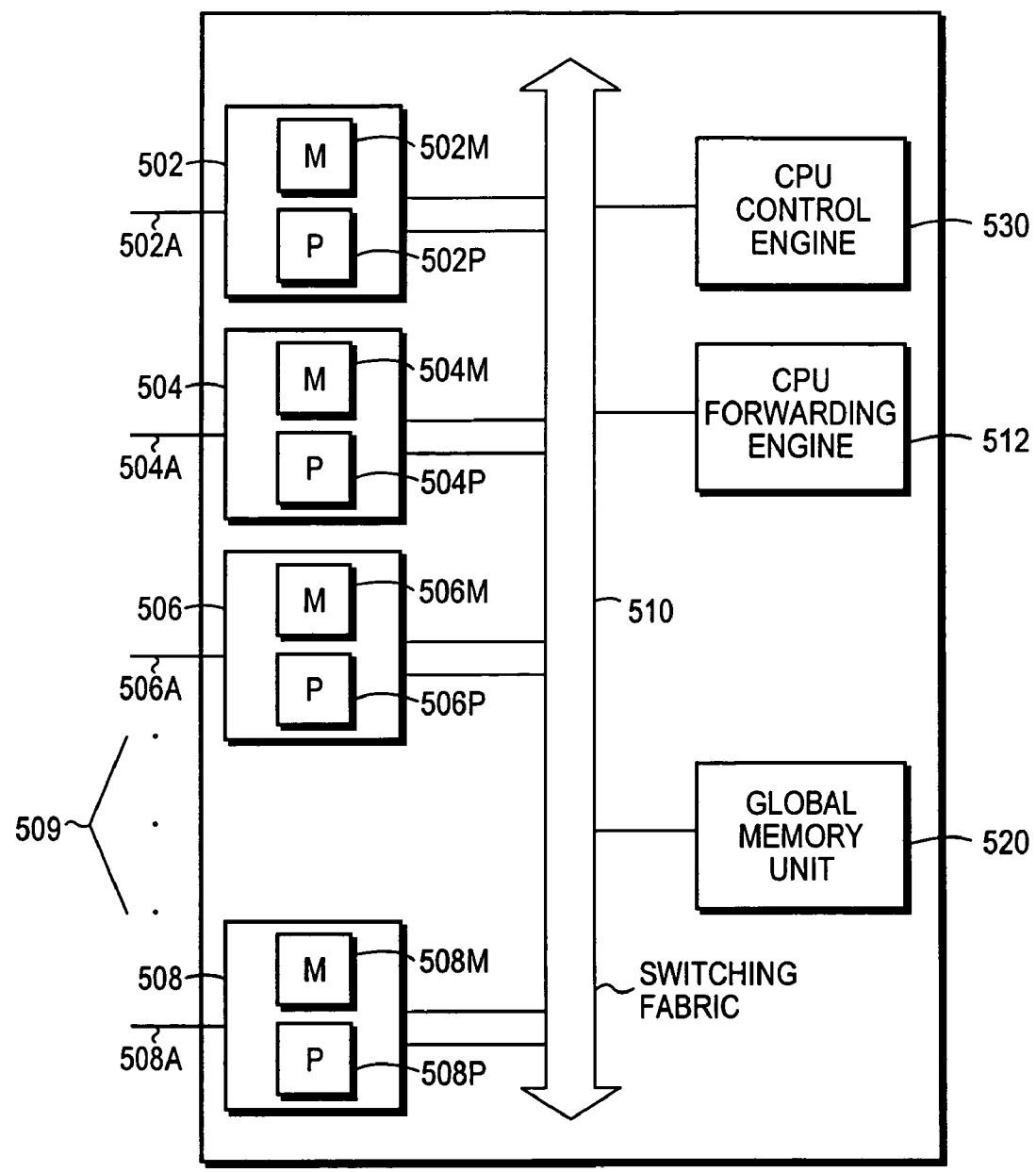
FIG. 5 is a block diagram of a router.

Turning now to FIG. 5, block diagram 500 of a representative hardware structure for internal operation of a router is shown. Each linecard 502, 504, . . . 508 supports a port. For example, linecard 502 has port 502A; linecard 504 has port 504A; linecard 506 has port 506A, . . . and linecard 508 has port 508A, etc. Each linecard has a memory unit. For example, linecard 502 has memory unit 502M, linecard 504 has memory unit 504M, linecard 506 has memory unit 506M . . . and linecard 508 has memory unit 508M, etc. Each line card has a processor P, indicated by blocks 502P, 504P, 506P, . . . 508P, etc. In an alternative embodiment of the invention, a linecard may support a plurality of ports rather than only one port as is shown in FIG. 5. Three dots 509 indicate that a router 500 may have many line cards.

The various linecards are interconnected by switch fabric 510. Switch fabric 510 may be, for example, a crossbar type switch fabric, an ATM based switch fabric, or may be simply a computer bus. A central processor unit forwarding engine 512 also attaches to switch fabric 510. In operation, a packet arrives at a port of a linecard and is transferred by switch fabric 510 to memory units in the required linecards.

Further, CPU control engine 530 attaches to switch fabric 510. CPU control engine 530 is used to execute various control protocols for the network device. For example, CPU control engine 530 may be used to execute a multicast group protocol to establish a multicast distribution tree, to operate a multicast group distribution tree to forward multicast group data packets down the distribution tree, to operate a multicast group protocol to transmit NAK packets 200 up along the multicast group distribution tree, Link State Routing Protocol, etc. Data read from various fields of a received packets are transferred to CPU control engine 530. Then CPU control engine exercises control of the network device through switch fabric 510, through control lines not shown in FIG. 5, etc. For example, process 400 shown in FIG. 4 may execute in CPU control engine 530.

For example, in the event that a packet is received from an external connection at port 502A, the packet arrives at port 502A, is stored in memory unit 502M, and is simultaneously transmitted on switch fabric 510 to all of the other linecards, where the packet is stored in the memory unit of each of the other linecards. The memory 502M in the receiving linecard is necessary as a buffer in the event that switch fabric 510 is busy at the time that the packet arrives at port 502A. Processors 502P, 504P, 506P, ... 508P, etc. on each linecard receive information from circuits on the linecard interpreting fields of the packets as the packet is being received.

In an exemplary embodiment of the invention, processors 502P, 504P, 506P, ... 508P, etc. on the individual linecards act as forwarding engines and make decisions concerning the ports through which the packet is to be transmitted. Processors 502P, 504P, 506P, ... etc. may assemble the NAK packet 200 of FIG. 2.

In an alternative exemplary embodiment of a router, as the packet is being transferred on switch fabric 510 to all of the other linecards, fields of the packet are interpreted by circuitry in the receiving linecard, information is transferred to CPU forwarding engine 512, and CPU 512 makes decisions concerning which ports the packet is to be transmitted out through. Once CPU 512 makes a decision as to which ports the packet should be forwarded through, CPU 512 asserts control lines (not shown in FIG. 5) which grant permission to the appropriate linecards to transmit the packet out through that linecard's port. By selecting the output ports, CPU 512 implements a multicast distribution tree for router 300 of FIG. 3. For example, CPU control engine 530 reads fields of a multicast group data packet received at port 302 of router 300. In response to reading these fields of the multicast group data packet, CPU control engine 530 commands ports on the multicast distribution tree to transmit the multicast group data packet. Further, as NAK packets 200 arrive at downstream ports 304, 306, 308 of router 300, of the multicast group distribution tree, CPU 530 identifies the upstream port 302 and controls transmission of the corresponding outgoing NAK packet through the upstream port 302.

In accordance with the invention, a processor provided by the router, such as for example linecard processors 502P, 504P, ... 508P, etc., or for example the forwarding engine CPU 512, decide that this particular multicast address in a packet arriving on the input port must be replicated and transmitted out through the assigned ports for that particular multicast address.

In another exemplary embodiment of the hardware 500, the line cards read the fields of an incoming packet, and when a routing decision is required, the linecard processors or the CPU forwarding engine 512 selects the required route. Also, when a link becomes inoperative, the CPU 512 learns this fact and initiates a new round of multicast group distribution selections of links for the tree, in order to change the routing pathways to the various other routers in the network.

The exemplary internal architecture of a router as shown in block diagram 500 permits line speed transfer of an incoming packet to one or more outgoing ports, simultaneously with receipt of the packet. Only a small delay is encountered, depending upon factors, for example, the state of switch fabric 510 as the packet is received at its incoming port, and the delay imposed by ordinary switch fabric transfer processes along switch fabric 510.

In an alternative exemplary design of a Layer 2 switch or Layer 3 router, a linecard may transfer an incoming packet to global memory unit 520. CPU 512 reads fields of the packet and decides which linecards must transmit the packet. After the packet is received into global memory 520, the packet is read by each linecard which must transmit the packet, and then the packet is transmitted by the linecards. In either event, the hardware reads the fields of the appropriate Layer, and responds by making the appropriate decision. For example, NAK packet 200 may be assembled by the line card supporting the upstream port 302 of the multicast distribution tree. Alternatively, the NAK packet 200 may be assembled in global memory unit 520 by CPU control engine 530, and then transferred to line card memory for transmission out through the upstream port 302.

Second Exemplary Embodiment

In the FIRST EXEMPLARY EMBODIMENT of the invention, the loss report is carried by a NAK message in reverse up the multicast distribution tree. Alternatively, a generalized loss report message may be used to carry the loss rate from a receiver station to a source station.

For example, receivers may periodically transmit a loss report message up the multicast distribution tree, rather than wait for receipt of a NAK from a receiver station. Such a loss report message is referred to as a "unsolicited periodic loss report". An advantage to using an unsolicited periodic loss report is that the periodicity of the message may be used by the multicast system as an indication that the receiver station remains an active receiver station.

Third Exemplary Embodiment

In the FIRST EXEMPLARY EMBODIMENT of the invention, the computation of the loss rate by a router computes the worst loss rate reported from any of the links connected to the router. The computed loss rate is then forwarded upstream in a loss rate report to the next upstream router. Alternatively, other computational methods may be utilized to compute the loss rate to be forwarded upstream by a router.

For example, a loss rate at a port of the router may be computed by adding the loss rate received in a loss rate report at the port (LP[received]) to the loss rate measured by the router at that port (LP[measured]). For example, then the largest computed loss rate at any port (in the multicast distribution tree) of the router is written into the loss rate report transmitted upstream to the next higher router in the multicast distribution tree.

Alternatively, any convenient computational scheme which measures the loss rate experienced by the router, based on received and measured loss rates ports of that router, may be used as the loss rate transmitted upstream to the next higher router in the multicast distribution tree.

Fourth Exemplary Embodiment

In the FIRST EXEMPLARY EMBODIMENT of the invention, the loss report is transmitted by a router to the next higher router in the distribution tree as a unicast message. Alternatively, the loss report may be transmitted as a multicast message by a router to a higher router in the multicast distribution tree.

For example, a multicast loss report message may be utilized which has the time to live hop count set to one, "1", so that the multicast message does not leave the local area. The router in the multicast distribution tree receives the multicast loss report message, computes a new loss report value, and then forwards the new loss report value upstream to the next higher router in the multicast distribution tree as another multicast message. Use of a multicast message has the advantage that all receiver stations within one hop of the transmitting router receive the loss report message since it is a multicast message. The receiver stations are then informed about the losses occurring in the routers downstream from their position in the multicast distribution tree.

Fifth Exemplary Embodiment

In the FIRST EXEMPLARY EMBODIMENT of the invention, the loss rate determined by a router is placed in a message sent upstream through the multicast distribution tree. Alternatively, a loss rate statistic is determined by the router and placed in the message sent upstream through the multicast distribution tree.

A loss rate statistic is computed from measured values of packet loss. For example, a time averaged loss rate may be used as the loss rate statistic. Alternatively, the largest loss rate at a port of the router may be used as the loss rate statistic. As a further alternative, an average value of loss rate measured at various ports of the router may be used as the loss rate statistic. As a further example, the loss rate statistic may be any useful statistic computed from: packet loss rates measured by the router; and, loss rates received by the router from loss report messages received by the router.

As a further example, a router may determine a variety of different loss rate statistics which it has observed. The router may then place each determined loss rate statistic into a separate field of a loss rate report message before transmitting the loss rate report message upstream along the multicast distribution tree. For example, a loss rate report message could contain three fields, one field for the largest loss rate determined by the router, one field for a time averaged loss rate, and one field for an average loss rate measured at the ports of the router. The transmitting station ultimately receives the loss rate statistics collected throughout the multicast distribution tree and may use the different loss rate statistics in controlling its transmission characteristics.

It is to be understood that the above-described embodiments are simply illustrative of the principles of the invention, and various other modifications and changes may be made by those skilled in the art which embody the principles of the invention and fall within the spirit and scope thereof.

What is claimed is:

1. A router controlling congestion on links attached to the router, said router comprising:
   a plurality of ports;
   a first port of said plurality of ports for receiving a data packet;
   a second port of said plurality of ports for transmitting said data packet;
   a receiver to receive an incoming loss report message on said second port;
   a first processor to determine loss of packets on selected ports of said plurality of ports;
   a second processor to calculate, in response to said incoming loss report message and said loss of packets, a loss rate statistic; and
   a transmitter to transmit an outgoing loss report message through said first port, said outgoing loss report message containing a field having said loss rate statistic written therein.

2. The router as in claim 1 wherein said loss rate statistic is a largest loss rate in a set of loss rates determined for said selected ports of said plurality of ports.

3. The router of claim 1, further comprising:
   a linecard supporting at least one of said plurality of ports, said linecard having said first processor and a memory mounted thereon, said first processor computing said loss of packets.

4. The router of claim 1, further comprising: said outgoing loss report message is carried in a NAK packet.

5. The router of claim 1, further comprising: said outgoing loss report message is transmitted by said router in response to the router receiving a loss report message from a downstream router.

6. The router of claim 1, further comprising: said outgoing loss report message is transmitted by said router in response to the router receiving a loss report message from a downstream receiver station.

7. The router of claim 1, further comprising: said outgoing loss report message is periodically transmitted by said router.

8. The router of claim 1, further comprising: a central processor (CPU) forwarding engine, said CPU forwarding engine determining which port said outgoing loss report message is to be transmitted.

9. The router as in claim 1, further comprising: a central processor (CPU) control engine, said CPU control engine generating said outgoing loss report message.

10. The router as in claim 1, wherein said outgoing loss report message is received at a source station of a multicast distribution tree, said source station controlling a transmission rate of data packets transmitted in said multicast distribution tree based on the value of said loss rate statistic stored in said outgoing loss report message.

11. The router as in claim 1, wherein said outgoing loss report message is not transmitted by said transmitter if an absolute value of a fractional change of said loss rate statistic, as compared with a previous loss rate statistic, is less than or equal to a predetermined limit value.

12. The router as in claim 1, wherein said outgoing loss report message stores a lifetime associated with said loss rate statistic, said lifetime indicating a duration of time for which said loss rate statistic is valid.

13. A router controlling congestion on links attached to the router, said router comprising:
   a plurality of ports;
   a first port of said plurality of ports for receiving a data packet;
   a second port of said plurality of ports for transmitting said data packet;
   a receiver to receive an incoming loss report message on said second port;
   a first processor to determine loss of packets on selected ports of said plurality of ports;

a second processor to calculate, in response to said incoming loss report message and said loss of packets, a loss rate statistic; and a transmitter to transmit an outgoing loss report message through said first port, said outgoing loss report message containing a field having said loss rate statistic written therein, wherein said loss rate statistic is a time averaged loss rate.

14. A method for operating a router, said method comprising:

receiving a multicast group data packet at a first port;

transmitting a replica of said multicast group data packet from a second port;

receiving an incoming loss report message on said second port;

computing a loss of packets on selected ports of said router;

calculating, in response to said incoming loss report message and said loss of packets, a loss rate statistic; and transmitting an outgoing loss report message through said first port, said outgoing loss report message containing said loss rate statistic in a field of said outgoing loss report message.

15. The method of claim 14, further comprising: choosing said loss rate statistic as a largest packet loss rate in a set of loss rates computed for said selected ports of said router.

16. The method of claim 14, further comprising:

selecting said selected ports as members of a multicast group distribution tree.

17. The method of claim 14, further comprising:

determining if said loss rate statistic has not expired for at least one port of said router, where said at least one port includes all ports of a multicast group distribution tree of said multicast group; and writing said loss rate statistic into said outgoing loss report message before transmitting said outgoing loss report message.

18. The method of claim 14, further comprising: transmitting said outgoing loss report message as a NAK packet.

19. The method of claim 14, further comprising: transmitting said outgoing loss report message in response to receiving said incoming loss report message.

20. The method of claim 14, further comprising: transmitting said outgoing loss report message periodically.

21. The method of claim 14, further comprising: transmitting said outgoing loss report message as a unicast message to a next upstream router capable of responding to said outgoing loss report message.

22. The method of claim 14 further comprising: transmitting said outgoing loss report message as a multicast message.

23. A computer readable media having instructions written thereon for execution on a processor for practicing the method of claim 14.

24. The method as in claim 14, further comprising:

receiving said outgoing loss report message at a source station of a multicast distribution tree; and controlling, in response to receiving said outgoing loss report message, a transmission rate of data packets transmitted by said source station in said multicast distribution tree based on the value of said loss rate statistic stored in said outgoing loss report message.

25. The method as in claim 14, further comprising:

calculating an absolute value of a fractional change of said loss rate statistic as compared with a previous loss rate statistic; and preventing, in response to said calculated absolute value being less than or equal to a predetermined limit value, transmission of said outgoing loss report message.

26. The method of claim 14, further comprising:

associating with said loss rate statistic a lifetime for aging said loss rate statistic;

determining whether said loss rate statistic is valid based on the value of said lifetime associated with said loss rate statistic; and writing, in response to determining that said loss rate statistic is valid, said loss rate statistic into said outgoing loss report message before transmitting said outgoing loss report message.

27. A method for operating a router, said method comprising:

receiving a multicast group data packet at a first port;

transmitting a replica of said multicast group data packet from a second port;

receiving an incoming loss report message on said second port;

computing a loss of packets on selected ports of said router;

calculating, in response to said incoming loss report message and said loss of packets, a loss rate statistic;

transmitting an outgoing loss report message through said first port, said outgoing loss report message containing said loss rate statistic in a field of said outgoing loss report message; and choosing said loss rate statistic as a time averaged packet loss rate as determined by said router.

28. A router, comprising:

means for receiving a multicast group data packet at a first port;

means for transmitting a replica of said multicast group data packet from a second port;

means for receiving an incoming loss report message on said second port;

means for computing a loss of packets on selected ports of said router;

means for calculating, in response to said incoming loss report message and said loss of packets, a loss rate statistic; and means for transmitting an outgoing loss report message through said first port, said outgoing loss report message containing said loss rate statistic in a field of said outgoing loss report message.

29. A router controlling congestion on links attached to the router, said router comprising:

a plurality of ports;

a first port of said plurality of ports for receiving a data packet;

a second port of said plurality of ports for transmitting said data packet;

a receiver configured to receive an incoming loss report message on said second port;

a processor configured to determine loss of packets on selected ports of said plurality of ports, said processor being further configured to calculate, in response to said incoming loss report message and said loss of packets, a loss rate statistic; and a transmitter configured to transmit an outgoing loss report message through said first port, said outgoing loss report message containing a field having said loss rate statistic written therein.

30. A router controlling congestion on links attached to the router, said router comprising:

a plurality of ports;
a first port of said plurality of ports for receiving a data packet;
a second port of said plurality of ports for transmitting said data packet in a down-stream direction;
a receiver to receive a loss report message on said second port, said loss report traveling in an upstream direction;
a processor configured to determine loss of packets on a port of said plurality of ports and, in response to said loss report message and said loss of packets, to calculate a loss rate statistic; and
a transmitter configured to transmit an outgoing loss report message through said first port in said upstream direction, said outgoing loss report message containing a field having said loss rate statistic written therein.

31. The router as in claim 30, further comprising:
said loss rate statistic is a largest loss rate in a set of loss rates determined for said selected ports of said plurality of ports.

32. The router as in claim 30, further comprising:
said loss rate statistic is a time averaged loss rate.

33. The router of claim 30, further comprising:
a linecard supporting at least one of said plurality of ports, said linecard having a linecard processor and a memory mounted thereon, said linecard processor computing said loss of packets.

34. The router of claim 30, further comprising:
a central processor (CPU) forwarding engine, said CPU forwarding engine determining which port said outgoing loss report message is to be transmitted.

35. The router as in claim 30, further comprising:
a central processor (CPU) control engine, said CPU control engine generating said outgoing loss report message.

36. The router of claim 30, further comprising:
said outgoing loss report message is carried in a NAK packet.

37. The router of claim 30, further comprising:
said outgoing loss report message is transmitted by said router in response to the router receiving a loss report message from a downstream router.

38. The router of claim 30, further comprising:
said outgoing loss report message is periodically transmitted by said router.

39. The router as in claim 30, further comprising:
said outgoing loss report message is received at a source station of a multicast distribution tree, said source station controlling a transmission rate of data packets transmitted in said multicast distribution tree based on the value of said loss rate statistic stored in said outgoing loss report message.

40. The router as in claim 30, further comprising:
said outgoing loss report message is not transmitted by said transmitter if an absolute value of a fractional change of said loss rate statistic, as compared with a previous loss rate statistic, is less than or equal to a predetermined limit value.

41. The router as in claim 30, further comprising:
said outgoing loss report message stores a lifetime associated with said loss rate statistic, said lifetime indicating a duration of time for which said loss rate statistic is valid.

42. A method for operating a router, comprising:
receiving a data packet traveling in a downstream direction at a first port;
transmitting a replica of said data packet from a second port in said downstream direction;
receiving a loss report message on said second port, said loss report traveling in an upstream direction;
computing a loss of packets on selected ports of said router;
calculating, in response to said loss report message and said loss of packets, a loss rate statistic; and
transmitting an outgoing loss report message through said first port in said upstream direction, said outgoing loss report message containing said loss rate statistic in a field of said outgoing loss report message.

43. The method of claim 42, further comprising:
calculating said loss rate statistic as a largest loss rate in a set of loss rates determined for said selected ports of said plurality of ports.

44. The method of claim 42, further comprising:
calculating said loss rate statistic as a time averaged loss rate.

45. The method of claim 42, further comprising:
computing said loss of packets by a processor mounted on a linecard, said linecard supporting at least one of said plurality of ports, said linecard having said linecard processor and a memory mounted thereon.

46. The method of claim 42, further comprising:
determining which port said outgoing loss report message is to be transmitted by a central processor (CPU) forwarding engine.

47. The method as in claim 42, further comprising:
generating said outgoing loss report message by a central processor (CPU) control engine.

48. The method of claim 42, further comprising:
carrying said outgoing loss report message in a NAK packet.

49. The method of claim 42, further comprising:
transmitting said outgoing loss report message by said router in response to the router receiving a loss report message from a downstream router.

50. The method of claim 42, further comprising:
transmitting said outgoing loss report message periodically by said router.

51. The method as in claim 42, further comprising:
transmitting said outgoing loss report message upstream so that it can be received at a source station of a multicast distribution tree, said source station controlling a transmission rate of data packets transmitted in said multicast distribution tree based on the value of said loss rate statistic stored in said outgoing loss report message.

52. The method as in claim 42, further comprising:
receiving said outgoing loss report message at a source station of a multicast distribution tree; and
controlling, in response to receiving said outgoing loss report message, a transmission rate of data packets transmitted by said source station in said multicast distribution tree based on the value of said loss rate statistic stored in said outgoing loss report message.

53. The method as in claim 42, further comprising:
calculating an absolute value of a fractional change of said loss rate statistic as compared with a previous loss rate statistic; and
preventing, in response to said calculated absolute value being less than or equal to a predetermined limit value, transmission of said outgoing loss report message.

54. The method of claim 42, further comprising:
associating with said loss rate statistic a lifetime for aging said loss rate statistic;

determining whether said loss rate statistic is valid based on the value of said lifetime associated with said loss rate statistic; and writing, in response to determining that said loss rate statistic is valid, said loss rate statistic into said outgoing loss report message before transmitting said outgoing loss report message.

55. A router, comprising:

means for receiving a data packet traveling in a downstream direction at a first port;

means for transmitting a replica of said data packet from a second port in said downstream direction;

means for receiving a loss report message on said second port, said loss report traveling in an upstream direction;

means for computing a loss of packets on selected ports of said router;

means for calculating, in response to said loss report message and said loss of packets, a loss rate statistic; and means for transmitting an outgoing loss report message through said first port in said upstream direction, said outgoing loss report message containing said loss rate statistic in a field of said outgoing loss report message.

56. The router of claim 55, further comprising:

means for calculating said loss rate statistic as a largest loss rate in a set of loss rates determined for said selected ports of said plurality of ports.

57. The router of claim 55, further comprising:

means for calculating said loss rate statistic as a time averaged loss rate.

58. The router of claim 55, further comprising:

means for computing said loss of packets by a processor mounted on a linecard, said linecard supporting at least one of said plurality of ports, said linecard having said linecard processor and a memory mounted thereon.

59. The router of claim 55, further comprising:

means for determining which port said outgoing loss report message is to be transmitted by a central processor (CPU) forwarding engine.

60. The router as in claim 55, further comprising:

means for generating said outgoing loss report message by a central processor (CPU) control engine.

61. The router of claim 55, further comprising:

means for carrying said outgoing loss report message in a NAK packet.

62. The router of claim 55, further comprising:

means for transmitting said outgoing loss report message by said router in response to the router receiving a loss report message from a downstream router.

63. The router of claim 55, further comprising:

means for transmitting said outgoing loss report message periodically by said router.

64. The router as in claim 55, further comprising:

means for transmitting said outgoing loss report message upstream so that it can be received at a source station of a multicast distribution tree, said source station controlling a transmission rate of data packets transmitted in said multicast distribution tree based on the value of said loss rate statistic stored in said outgoing loss report message.

65. The router as in claim 55, further comprising:

means for receiving said outgoing loss report message at a source station of a multicast distribution tree; and means for controlling, in response to receiving said outgoing loss report message, a transmission rate of data packets transmitted by said source station in said multicast distribution tree based on the value of said loss rate statistic stored in said outgoing loss report message.

66. The router as in claim 55, further comprising:

means for calculating an absolute value of a fractional change of said loss rate statistic as compared with a previous loss rate statistic; and means for preventing, in response to said calculated absolute value being less than or equal to a predetermined limit value, transmission of said outgoing loss report message.

67. The router of claim 55, further comprising:

means for associating with said loss rate statistic a lifetime for aging said loss rate statistic;

means for determining whether said loss rate statistic is valid based on the value of said lifetime associated with said loss rate statistic; and means for writing, in response to determining that said loss rate statistic is valid, said loss rate statistic into said outgoing loss report message before transmitting said outgoing loss report message.

68. A computer readable media having instructions written thereon for execution on a processor for the practice of a method of operating a router, the method having the steps of:

receiving a multicast group data packet at a first port;

transmitting a replica of said multicast group data packet from a second port;

receiving an incoming loss report message on said second port;

computing a loss of packets on selected ports of said router;

calculating, in response to said incoming loss report message and said loss of packets, a loss rate statistic; and transmitting an outgoing loss report message through said first port, said outgoing loss report message containing said loss rate statistic in a field of said outgoing loss report message.

69. A computer readable media having instructions written thereon for execution on a processor for the practice of a method of operating a router, the method having the steps of:

receiving a data packet traveling in a downstream direction at a first port;

transmitting a replica of said data packet from a second port in said downstream direction;

receiving a loss report message on said second port, said loss report message traveling in an upstream direction;

computing a loss of packets on selected ports of said router;

calculating, in response to said loss report message and said loss of packets, a loss rate statistic; and transmitting an outgoing loss report message through said first port in said upstream direction, said outgoing loss report message containing said loss rate statistic in a field of said outgoing loss report message.

* * * * *